(12) United States Patent
Carlson (10) Patent No.: US 11,400,794 B2
(45) Date of Patent: Aug. 2, 2022

(54) FLAP-CUSHIONING PRESSURE RELIEF ASSEMBLY

(71) Applicant: Illinois Tool Works Inc., Glenview, IL (US)

(72) Inventor: Daniel David Carlson, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 52 days.

(21) Appl. No.: 16/078,428

(22) PCT Filed: Feb. 1, 2017

(86) PCT No.: PCT/US2017/016023
§ 371 (c)(1),
(2) Date: Aug. 21, 2018

(87) PCT Pub. No.: WO2017/155637
PCT Pub. Date: Sep. 14, 2017

(65) Prior Publication Data
US 2019/0054803 A1    Feb. 21, 2019

Related U.S. Application Data

(60) Provisional application No. 62/307,031, filed on Mar. 11, 2016.

(51) Int. Cl.
*B60H 1/24* (2006.01)
*F16K 15/03* (2006.01)
*F16K 27/02* (2006.01)

(52) U.S. Cl.
CPC .......... *B60H 1/249* (2013.01); *F16K 15/031* (2013.01); *F16K 27/0227* (2013.01)

(58) Field of Classification Search
CPC combination set(s) only.
See application file for complete search history.

(56) References Cited

U.S. PATENT DOCUMENTS

| 5,247,912 A | 9/1993 | Boyesen |
| 6,837,784 B2 * | 1/2005 | Omiya ................. B60H 1/249 |
| | | 137/512.1 |

(Continued)

FOREIGN PATENT DOCUMENTS

| CN | 1590856 A | 3/2005 |
| CN | 1809401 A | 7/2006 |

(Continued)

OTHER PUBLICATIONS

International Search Report and Written Opinion for PCT/US2017/016023.

(Continued)

*Primary Examiner* — Steven B McAllister
*Assistant Examiner* — Elizabeth M. May
(74) *Attorney, Agent, or Firm* — Quarles & Brady LLP (57) ABSTRACT

A pressure relief assembly includes a housing defining an air passage chamber having at least one airflow opening. A flap is secured within the air passage chamber. The flap is configured to move into an open position to expose the airflow opening(s) to relieve air pressure. A cushion is secured to the housing underneath the flap. The cushion is configured to cushion motion of the flap. A first attachment securely couples the flap to the housing. A second attachment securely couples the cushion to the housing. The first attachment is separate and distinct from the second attachment.

8 Claims, 7 Drawing Sheets

(56) References Cited

U.S. PATENT DOCUMENTS

| | | | |
|---|---|---|---|
| 7,188,622 B2 * | 3/2007 | Martin | A62B 18/10 128/206.15 |
| 2004/0160089 A1 | 8/2004 | Gupta et al. | |
| 2004/0261867 A1 | 12/2004 | Carlson | |
| 2006/0025063 A1 | 2/2006 | Burr et al. | |
| 2009/0104866 A1 | 4/2009 | Loewe | |
| 2014/0242897 A1 | 8/2014 | Rizzo et al. | |
| 2015/0165873 A1 * | 6/2015 | Schwarzkopf | F16K 15/035 454/70 |
| 2015/0283882 A1 | 10/2015 | Juroszek et al. | |
| 2016/0152114 A1 * | 6/2016 | Yamamoto | F16K 47/02 454/162 |
| 2018/0156355 A1 * | 6/2018 | Markie | B60H 1/249 |

FOREIGN PATENT DOCUMENTS

| | | |
|---|---|---|
| CN | 101450602 A | 6/2009 |
| CN | 201346975 Y | 11/2009 |
| CN | 101832195 A | 9/2010 |
| CN | 101855101 A | 10/2010 |
| CN | 102261800 A | 11/2011 |
| CN | 202448734 U | 9/2012 |
| CN | 103608203 A | 2/2014 |
| CN | 203580565 U | 5/2014 |
| CN | 103930292 A | 7/2014 |
| CN | 103993806 A | 8/2014 |
| CN | 204749793 U | 11/2015 |
| EP | 0692397 | 1/1996 |
| EP | 1428704 | 6/2004 |
| EP | 2011692 A1 | 1/2009 |
| EP | 2481617 A2 | 8/2012 |
| GB | 2330793 | 5/1999 |
| KR | 100776294 B1 | 11/2007 |
| KR | 20130033029 A | 4/2013 |
| WO | 2014175131 A1 | 10/2014 |

OTHER PUBLICATIONS

First Office Action from corresponding Chinese Patent Application No. 201780015967.9, dated May 17, 2021 (24 pages) (English translation included).

Search Report, from corresponding Chinese Patent Application No. 201780015967.9, dated May 6, 2021 (3 pages).

Guozhong Zhou, "Design and Application of Ventilation and Noise Reduction in Totally Enclosed Vehicle Test Library", Science & Technology Vision, May 30, 2013, pp. 60-62 (5 pages) (English abstract included).

* cited by examiner

FLAP-CUSHIONING PRESSURE RELIEF ASSEMBLY

RELATED APPLICATIONS

This application is a National Phase of International Application No. PCT/US2017/016023, filed Feb. 1, 2017, which relates to and claims priority benefits from U.S. Provisional Patent Application No. 62/307,031 entitled "Pressure Relief Assembly Having Underflap Cushion," filed Mar. 11, 2016, both which are hereby incorporated by reference in their entireties.

FIELD OF EMBODIMENTS OF THE DISCLOSURE

Embodiments of the present disclosure generally relate to a venting or pressure relief device configured for use in an enclosed area, such as an automobile, and more particularly to systems and methods for reducing noise and/or improving sealing of a pressure relief assembly.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

A conventional pressure relief device includes a plastic housing having a plurality of air passages. A light membrane is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

As the flaps close, noise is generated, which may be objectionable to passengers. For example, flaps of a pressure relief device may slap closed or bounce off of a support several times after a door closing event, generating an objectionable noise to vehicle occupants.

Certain known pressure relief devices include felt cushions that are used in conjunction with flaps. The felt cushions typically have the same peripheral outline as the flaps, and secure to housings via the same attachment devices or mechanisms as used by the flaps.

However, using the same attachment devices for a flap and a cushion typically precludes the cushion from being in a recessed area below or otherwise inside of a peripheral envelope of an airflow opening of a pressure relief device. The positioning of the cushion under the entire surface of a similarly-shaped flap generally inhibits, minimizes, or otherwise reduces sealing around a peripheral air flow opening of the pressure relief device, as the felt holds the flap off of the opening.

Figure 1:
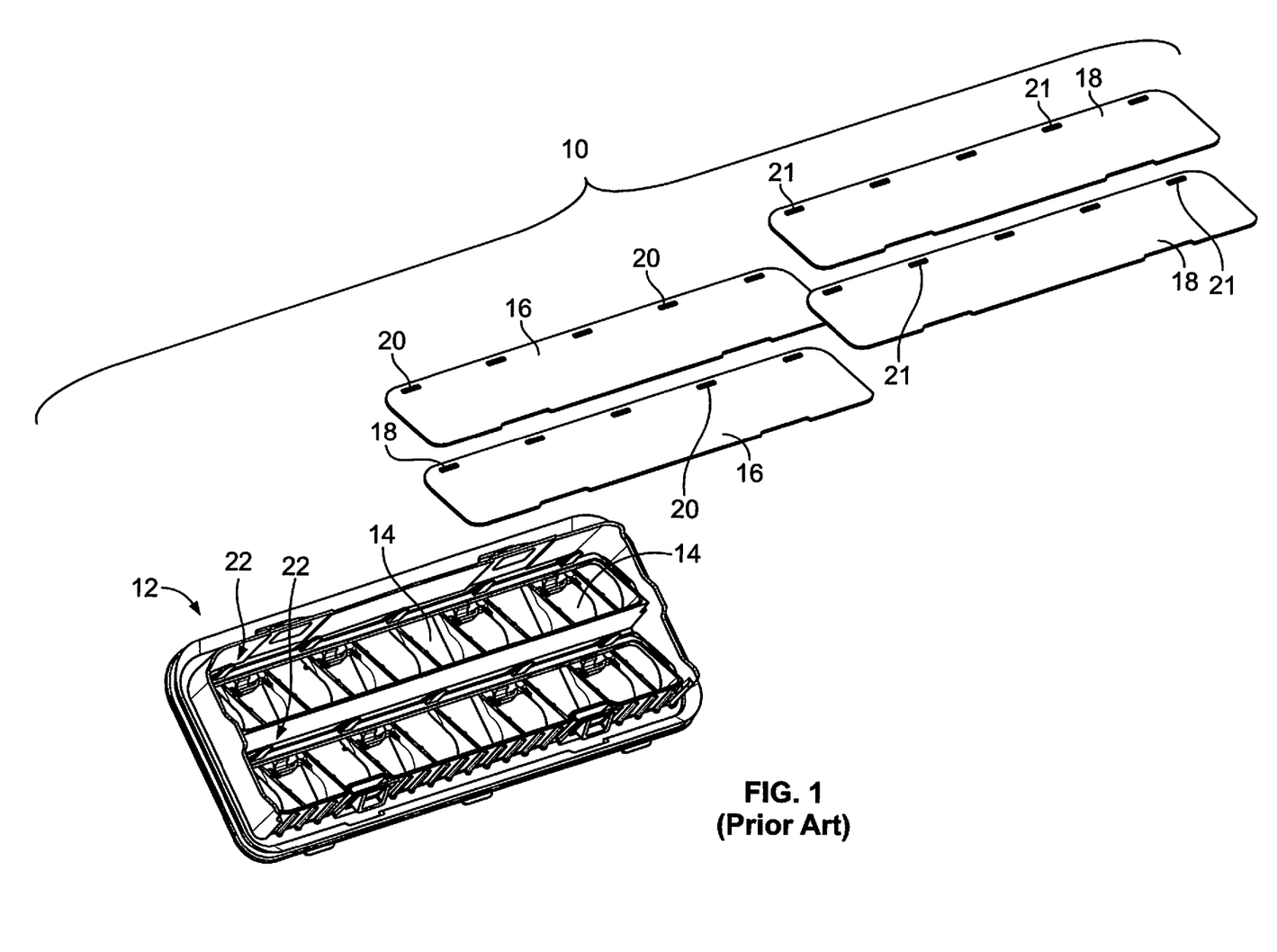
FIG. 1 illustrates a front perspective exploded view of a known pressure relief device.

FIG. 1 illustrates a front perspective exploded view of a known pressure relief device 10. The pressure relief device 10 includes a main housing 12 that defines a plurality of airflow openings 14. As shown in FIG. 1, felt cushions 16 are substantially the same size and shape as flaps 18. The cushions 16 include channels 20, while the flaps 18 include channels 21. The housing 12 includes posts 22 above airflow openings 14. The posts 22 are configured to securely couple both the cushions 16 and the flaps 18. In particular, the cushions 16 are first aligned over and coupled to the housing 12 such that the posts 22 securely connect to the cushions 16 through the channels 20. Next, the flaps 18 are aligned over the cushions 16 such that the channels 21 align over respective channels 20. The flaps 18 are then coupled to the housing by way of the posts 22 securely connecting to the flaps 18 through the channels 21. As such, the same posts 22 provide attachment mechanisms that securely connect both the cushions 16 and the flaps 18 to the housing 12. That is, both the flaps 18 and the similarly-shaped cushions 16 attach to the same posts 22, with the cushions 16 being first attached to the housing 12 and positioned underneath the flaps 18. However, because the flaps 18 are installed over the cushions 16, leak paths exist between the housing 12 and the cushions 16 and the flaps 18. The cushions 16 are interposed between a surface of the housing 12 to be sealed and the flaps 18. Overall, the cushions 16 (which directly contact portions of the housing 12 surrounding the airflow openings 14) do not seal as well as the flaps 18.

SUMMARY OF EMBODIMENTS OF THE DISCLOSURE

A need exists for a pressure relief device that cushions flap motion, thereby reducing noise, while at the same time providing a reliable sealing interface that is devoid of leak paths. A need exists for a pressure relief device that reduces noise while maintaining a robust seal around airflow openings.

With those needs in mind, certain embodiments of the present disclosure provide a pressure relief assembly that includes a housing defining an air passage chamber having at least one airflow opening. A flap is secured within the air passage chamber. The flap is configured to move into an open position to expose the airflow opening(s) to relieve air pressure. A cushion is secured to the housing underneath the flap. The cushion is configured to cushion motion of the flap. A first attachment securely couples the flap to the housing. A second attachment securely couples the cushion to the housing. The first attachment is separate and distinct from the second attachment.

In at least one embodiment, the first attachment is at a first location of the housing. The second attachment is at a second location of the housing. The first location differs from the second location. In at least one embodiment, the first attachment is outside of the airflow opening(s), while the second attachment extends into the airflow opening(s).

The flap has a first size and a first shape. The cushion has a second size and a second shape. The first size and the first shape differ from the second size and the second shape. The flap has a first outer periphery. The cushion has a second outer periphery. The first outer periphery is greater than the second outer periphery. The flap is configured to sealingly engage the housing around the airflow opening(s) without the cushion interfering with the flap sealingly engaging the housing.

The first attachment may include a connecting post. The second attachment may include a hook. At least one lead-in ramp may be proximate to the hook. The lead-in ramp is configured to support a portion of the cushion. In at least one other embodiment, the second attachment includes at least one channel formed through a portion of the housing.

The flap may be formed of a flexible thermoplastic elastomer. The cushion may be formed of felt.

In at least one embodiment, the cushion includes at least one clearance hole. The housing includes at least one protuberance extending outwardly from a support rib. The protuberance(s) outwardly extends through the clearance hole(s) when the cushion is seated on the support rib. The protuberance(s) is configured to abut into an underside of the flap.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pressure relief assembly that includes one or more cushions and one or more flaps. In at least one embodiment, the cushions and the flaps are sized and shaped differently. Further, the flaps secure to a housing through a first set of attachments (such as hooks, clasps, latches, barbs, pins, or the like), while the cushions secure to the housing through a second set of attachments (such as hooks, clasps, latches, barbs, pins, or the like) that are different (for example, at different locations) than the first set of attachments. Embodiments of the present disclosure provide a pressure relief assembly including one or more cushions that are recessed behind, or inside of a peripheral envelope defined by one or more corresponding flaps, thereby allowing the flap(s) to seal around an airflow opening without interference from the cushion(s). The seal between the flap(s) and the housing protects a vehicle cabin from particle and gas intrusion when there is a slight vacuum induced in the vehicle, for example when the windows are slightly opened at highway speeds.

Figure 2:
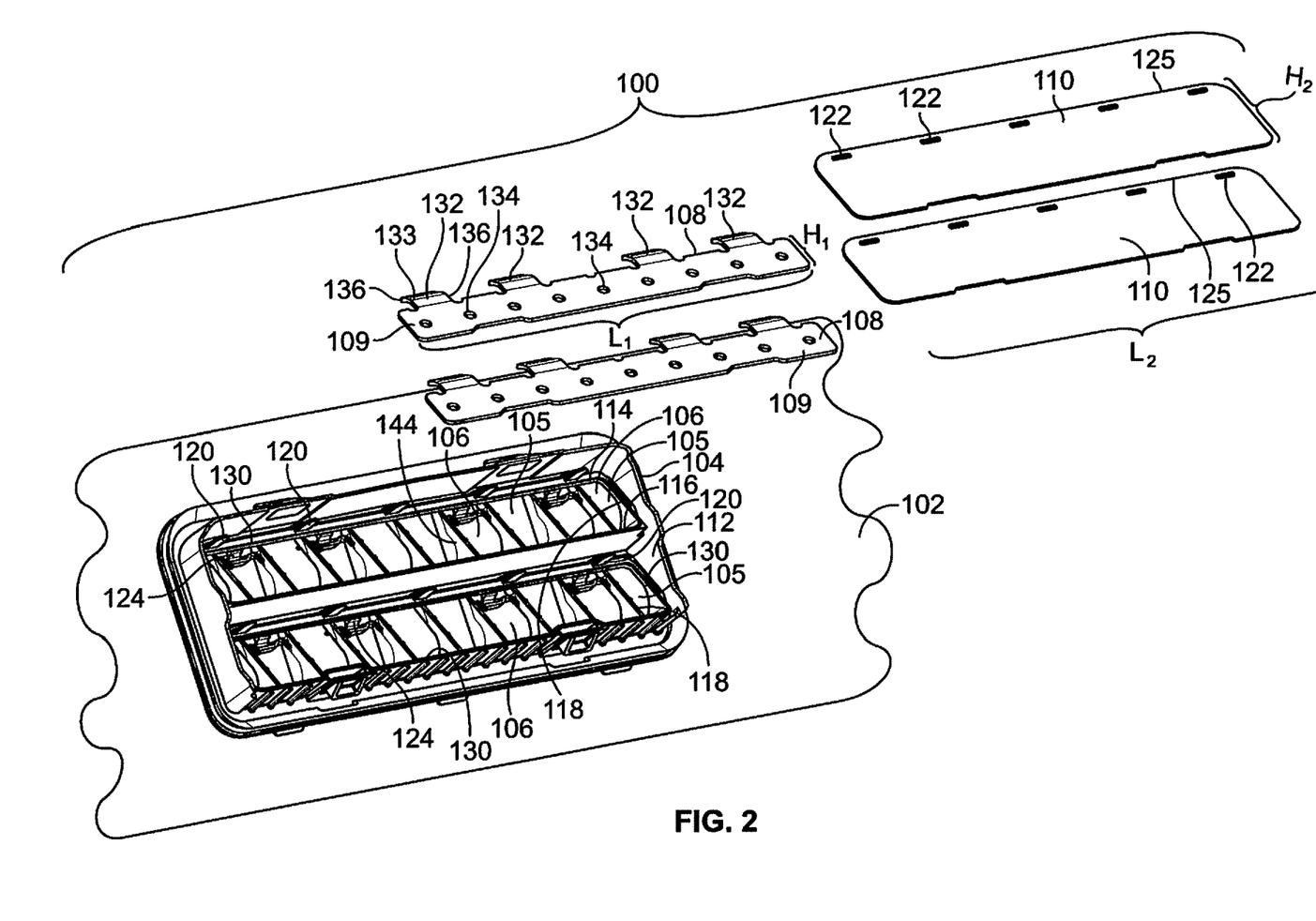
FIG. 2 illustrates a front perspective exploded view of a pressure relief assembly, according to an embodiment of the present disclosure.

FIG. 2 illustrates a front perspective exploded view of a pressure relief assembly 100, according to an embodiment of the present disclosure. The pressure relief assembly 100 is configured to secure to a panel 102, such as a panel of sheet metal of a vehicle, for example. The pressure relief assembly 100 secures into an opening formed through the panel 102. For example, the pressure relief assembly 100 snapably secures into the opening formed through the panel 102.

The pressure relief assembly 100 includes a frame or housing 104 that includes a plurality of air passage chambers 105 that define airflow openings 106. Cushions 108 secure to the housing 104 within the air passage chambers 105. Each cushion 108 may include a planar main body 109 formed of felt, for example. Each cushion 108 is configured to span across at least a portion of the airflow openings 106. Flaps 110 secure in the air passage chambers 105 over the airflow openings 106. The cushions 108 are positioned beneath the flaps 110. The pressure relief assembly 100 may include more or less air passage chambers 105, cushions 108, and flaps 110 than shown.

Each air passage chamber 105 includes lateral walls 112 integrally connected to top and bottom walls 114 and 116, respectively. An air passage wall 118 (such as partially defined by upper edges of support ribs 144) extends between the lateral, top and bottom walls 112, 114, and 116, respectively. The air passage walls 118 define the airflow openings 106 that are configured to allow air to pass therethrough. The air passage wall 118 angles upwardly from the top wall 114 towards the bottom wall 116. The angle of the air passage wall 118 may vary based on a desired amount of flap resistive force.

The housing 104 may be formed of a plastic, such as acrylic. In at least one embodiment, the housing 104 is formed of injection-molded polypropylene. The housing 104 may be formed through a thermoforming process, which is generally an efficient and economical way of making various plastic devices. During the manufacturing process, a roll of plastic may be fed into a cavity, and then the plastic is formed using heat and pressure.

Instead of a plurality of air passage chambers 105, the housing 104 may include a single air passage chamber 105. Also, optionally, the air passage wall 118 may be coplanar with a flat underside of the housing 104, instead of being angled.

In closed positions, the flaps 110 cover the air passage walls 118. Each flap 110 is anchored to the housing 104 proximate to the top wall 114. For example, each flap 110 mounts to the housing 104 through first attachments, such as connecting posts 120 outwardly extending above the airflow openings 106. Each flap 110 may be a flexible membrane having channels 122 formed proximate to an upper edge 125. The connecting posts 120 extend through the channels 122 to secure the flaps 110 to the housing 104. The flaps 110 may be formed of a flexible thermoplastic elastomer, such as ethylene propylene diene monomer (EPDM) rubber, polypropylene, Hytrel, Lexan, Tyvac or Mylar, for example.

In at-rest positions, the flaps 110 cover the airflow openings 106 formed through the air passage walls 118. As air pressure builds and is exerted into an underside of the flaps 110, the flaps 110 flap open so that the airflow openings 106 are exposed, thereby allowing air to vent through the pressure relief assembly 100.

In order to dampen vibrations and noise caused by flap motion, the cushions 108 are secured to the housing 104 below the flaps 110. The cushions 108 are shaped and sized differently than the flaps 110. As shown in FIG. 2, the cushions 108 are sized and shaped so that they do not extend over an entirety of the airflow openings 106, in contrast to the flaps 110. Further, the cushions 108 connect to the housing 104 through second attachments, such as hooks 124, which differ from the connecting posts 120. In particular, the hooks 124 are at different locations than the connecting posts 120. The connecting posts 120 and the hooks 124 may differ in size and shape, as well. Optionally, the first and second attachments may be of the same type, but at different locations.

Figure 3:
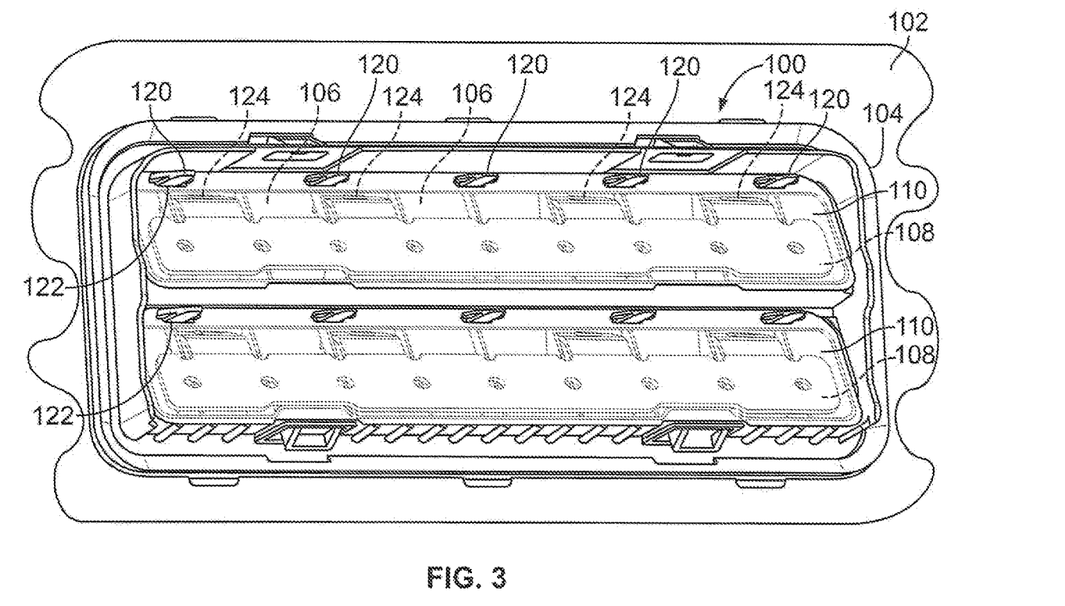
FIG. 3 illustrates a front perspective view of a pressure relief assembly, according to an embodiment of the present disclosure.

FIG. 3 illustrates a front perspective view of the pressure relief assembly 100, according to an embodiment of the present disclosure. In the closed positions, the flaps 110 are positioned over the cushions 108. The connecting posts 120 secure the flaps 110 to the housing 104. The hooks 124 are positioned at different locations than the connecting posts 120, and secure the cushions 108 to the housing 104. As shown, the hooks 124 may extend into the airflow openings 106, while the connecting posts 120 are outside of the airflow openings 106 (such as above the airflow openings 106).

Referring to FIGS. 2 and 3, the pressure relief assembly 100 includes two felt cushions 108 disposed underneath corresponding flaps 110, which may be formed of EPDM, for example. The cushions 108 define a smaller outline or footprint than the flaps 110, and utilize mounting attachments (such as the hooks 124) that are dedicated for use with the cushions 108, but not the flaps 110. In the installed position, the cushions 108 are disposed within a peripheral envelope defined by the flaps 110. In at least one embodiment, the cushions 108 do not include portions that are sandwiched between the flaps 110 and sealing interfaces of the housing 104, thereby allowing the flaps 110 to efficiently and robustly seal around the airflow openings 106 in the closed positions (without the cushions 108 interfering with the sealing engagement).

In the illustrated example, each flap 110 may include five channels 122 (such as slots), with each channel 122 accepted by a corresponding post 120 of the housing 104. The cushions 108 are disposed underneath the flaps 110, or interposed between the flaps 110 and a support structure (such as the support ribs 144) to cushion noise that may result from the flaps 110 impacting the housing 104 and/or the supporting structure 104 when closing.

Referring again to FIG. 2, in particular, each cushion 108 includes a length $L_1$, and a height $H_1$. Each flap 110 includes a length $L_2$, and a height $H_2$. The length $L_2$ is greater than the length $L_1$, while the height $H_2$ is greater than the height $H_1$. Accordingly, the flaps 110 have outer peripheries that exceed outer peripheries of the cushions 108. As such, when secured to the housing 102 and positioned underneath the flaps 110, each cushion 108 fits within a peripheral envelope of a corresponding flap 110 positioned directly over the cushion 108. The cushions 108 are smaller than the flaps 110. While the flaps 110 are sized and shaped to sealingly engage outer edge portions 130 of the housing 104 that define the airflow openings 106, the cushions 108 do not extend over the outer edge portions 130. As such, when the flaps 110 are closed over the airflow openings 106, the flaps 110 directly sealingly engage the outer edge portions 130 without the cushions 108 being interposed between the flaps 110 and the outer edge portions 130.

Each cushion 108 may include four tabs 132 that cooperate with the corresponding cushion hooks 124 of the housing 104 to secure the cushions 108 to the housing 104. Each cushion 108 may also include a plurality of clearance holes 134. Optionally, the cushions 108 may include more or less tabs 132 and clearance holes 134 than shown. Alternatively, the cushions 108 may not include the clearance holes 134.

To assemble the pressure relief assembly 100, the cushions 108 may be first attached to the housing 104 via the cushion hooks 124. Then, the flaps 110 may be attached to the housing via the posts 120.

Figure 4:
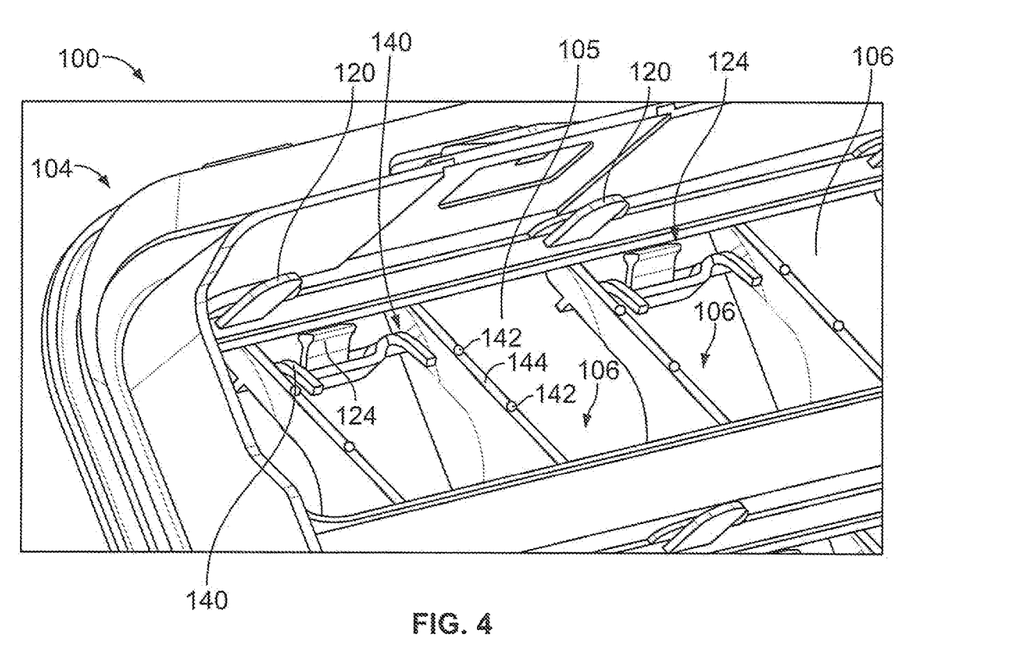
FIG. 4 illustrates a front perspective view of airflow openings of a housing of a pressure relief assembly, according to an embodiment of the present disclosure.

FIG. 4 illustrates a front perspective view of airflow openings 106 of the housing 104 of the pressure relief assembly 100, according to an embodiment of the present disclosure. FIG. 4 shows an enlarged view of aspects of the pressure relief assembly 100 of FIGS. 2 and 3 with a cushion 108 removed. The cushion hooks 124 include lead-in ramps 140 on either side. The lead-in ramps 140 are configured to help lead the cushion 108 into the correct position to be secured to the cushion hook 124. For example, bottom peripheral edges 136 of the cushion 108 may overlay the ramps 140.

Protuberances 142 (such as bumps, studs, posts, or the like) outwardly extend front surfaces 142 of support ribs 144 of the housing 104. The support ribs 144 support the flaps 110 in closed positions. The protuberances 142 minimize or otherwise reduce the amount of surface contact between the flaps 110 and the support ribs 144 (that is, the protuberances 142 support the flaps 110 above the ribs 144), which in turn reduces noise when the flaps 110 close.

Figure 5:
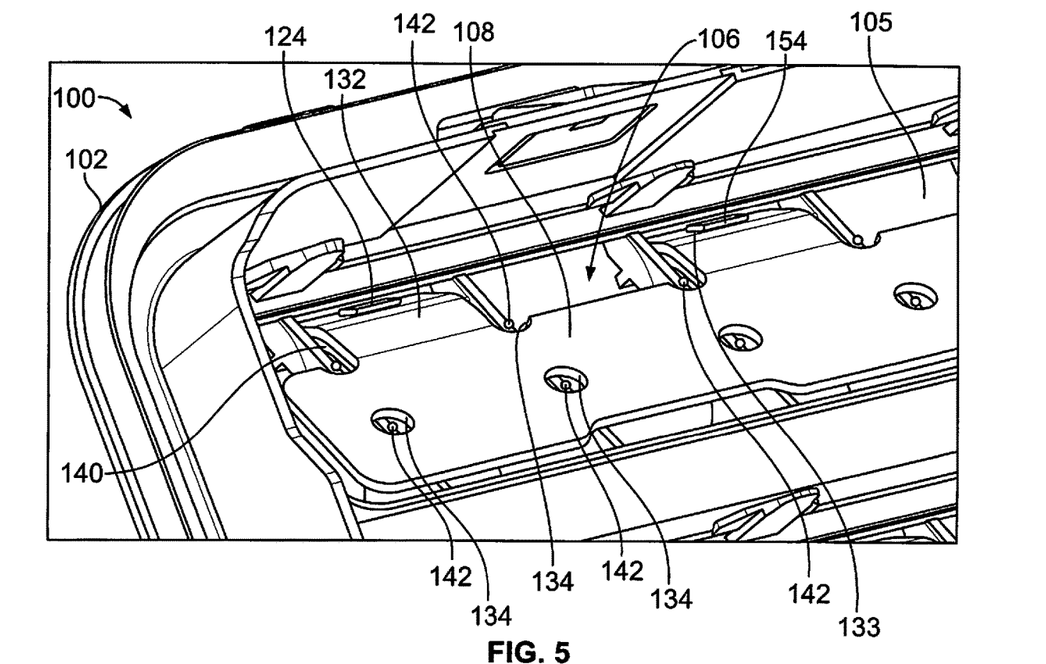
FIG. 5 illustrates a front perspective view of a cushion spanning over portions of airflow openings of a housing of a pressure relief assembly, according to an embodiment of the present disclosure.

FIG. 5 illustrates a front perspective view of a cushion 108 spanning over or otherwise through portions of the airflow openings 106 of the housing 102 of the pressure relief assembly 100, according to an embodiment of the present disclosure. As shown in FIG. 5, the cushion 108 attaches over the cushion hook 124, with the cushion material (e.g., felt) pliable or flexible enough to bend over the ramps 140 or other such lead-in and/or support features. Also, the clearance holes 134 or cutouts are aligned with the protuberances 144, thereby allowing the protuberances 144 to extend therethrough. In this manner, the protuberances 144 are configured to engage the flap 110 through the clearance holes 134.

Figure 6:
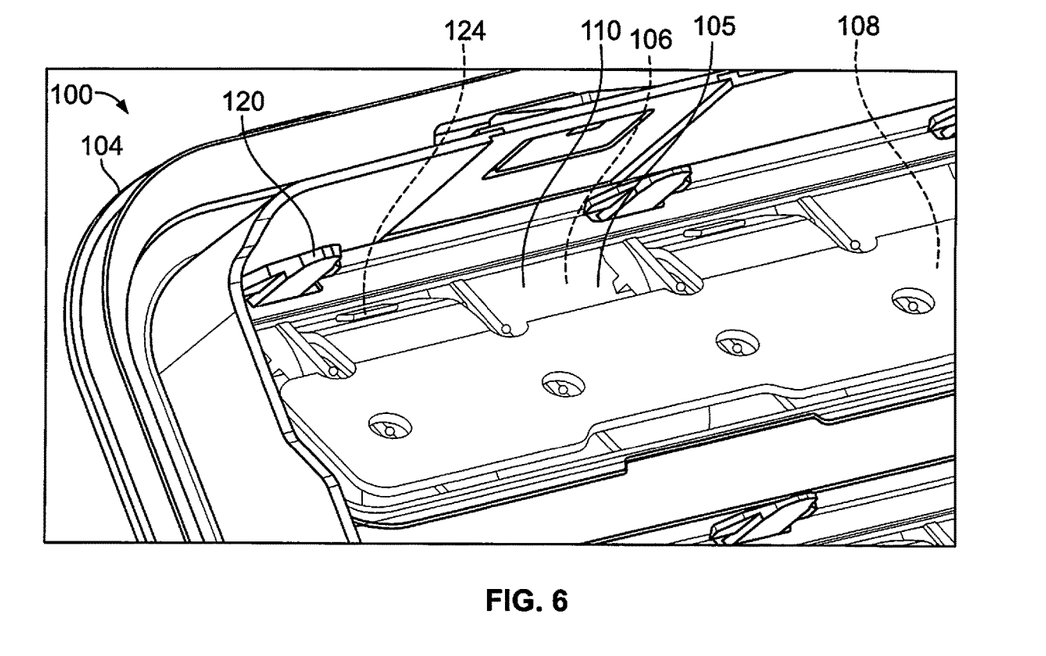
FIG. 6 illustrates a front perspective view of a flap overlaying a cushion spanning over portions of airflow openings of a housing of a pressure relief assembly, according to an embodiment of the present disclosure.

FIG. 6 illustrates a front perspective view of a flap 110 overlaying the cushion 108 spanning over or otherwise through portions of airflow openings 106 of the housing 102 of the pressure relief assembly 100, according to an embodiment of the present disclosure. The flap 110 attaches to the housing 102 over the cushion 108 via the separate and distinct posts 120 that are dedicated for use with the flap 110, but not with the cushion 108. The mounting or attachment points for the cushion 108 (for example, the hooks 124) are disposed within a peripheral envelope, footprint, or outline defined by the flap 110 such that the entire flap periphery may sealingly engage the housing 104 without interference from the cushion 108.

Referring to FIGS. 4-6, the connecting posts 120 provide first attachments for the flaps 110 that are outside of the air passages 106. For example, the connecting posts 120 are above the airflow passages 106. In contrast, the hooks 124 provide second attachments for the cushions 108 that may be disposed within the air passages 106. For example, the hooks 124 and ramps 140 may be span between support ribs 144. The hooks 124 and ramps 140 may be integrally formed and molded with the housing 104.

Figure 7:
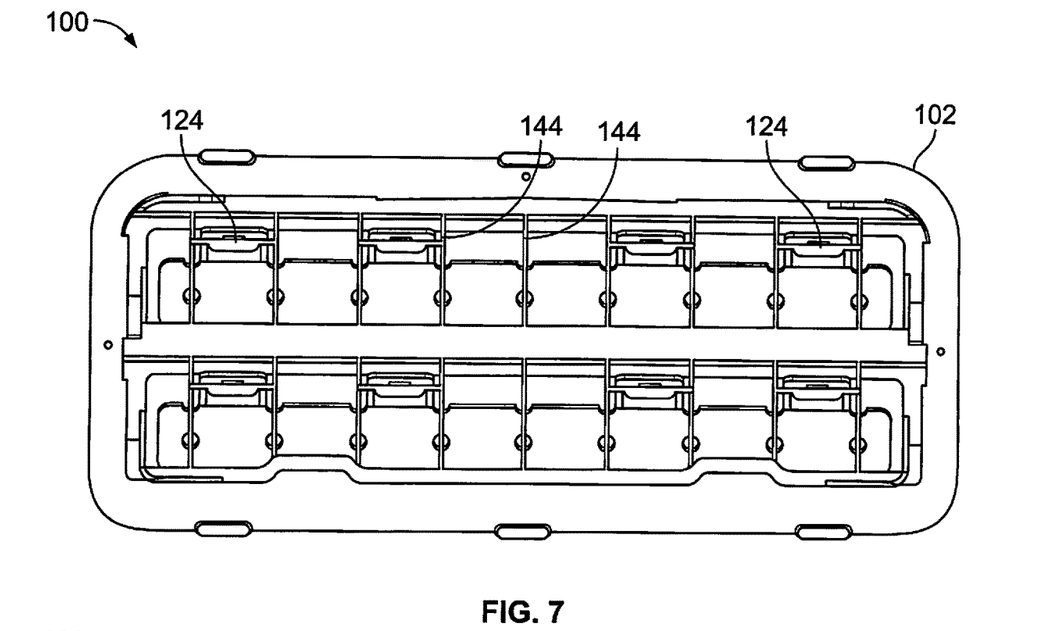
FIG. 7 illustrates a rear view of a pressure relief assembly, according to an embodiment of the present disclosure.
Figure 8:
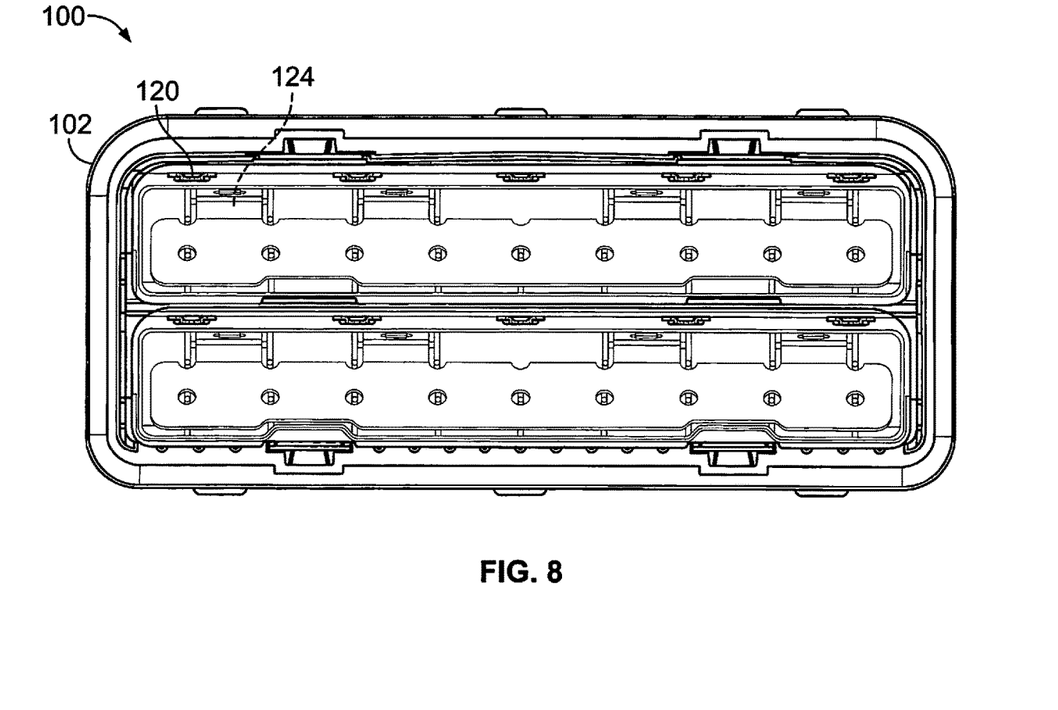
FIG. 8 illustrates a front view of a pressure relief assembly, according to an embodiment of the present disclosure.

FIG. 7 illustrates a rear view of the pressure relief assembly 100. FIG. 8 illustrates a front view of the pressure relief assembly 100. As indicated, the pressure relief assembly 100 is configured to be secured within an opening of a panel, such as within a vehicle.

Figure 9:
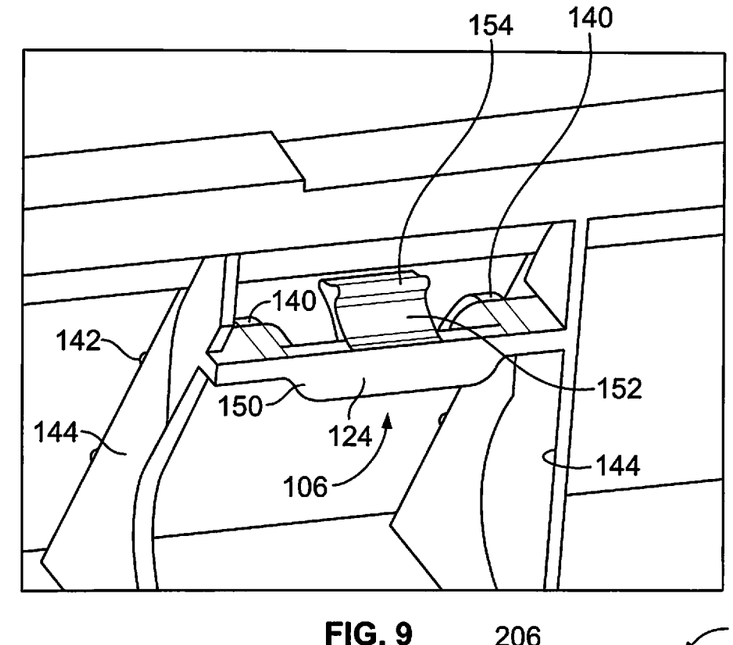
FIG. 9 illustrates a rear perspective view of a cushion hook, according to an embodiment of the present disclosure.

FIG. 9 illustrates a rear perspective view of the cushion hook 124, according to an embodiment of the present disclosure. As shown in FIG. 9, the cushion hook 124 includes a spanning beam 150 that extends between two support ribs 140 within an airflow passage 106. An extension beam 152 frontwardly extends from the spanning beam 150. A distal, free end of the extension beam 152 includes an expanded head 154. The expanded head 154 fits through a channel 133 formed through the tab 132 of the cushion 108 (shown in FIGS. 2 and 5) to securely couple the cushion 108 to the housing 102. The ramps 140 extend upwardly and frontwardly from the spanning beam 150 proximate to the support ribs 144 and are spaced from the extension beam 152.

Figure 10:
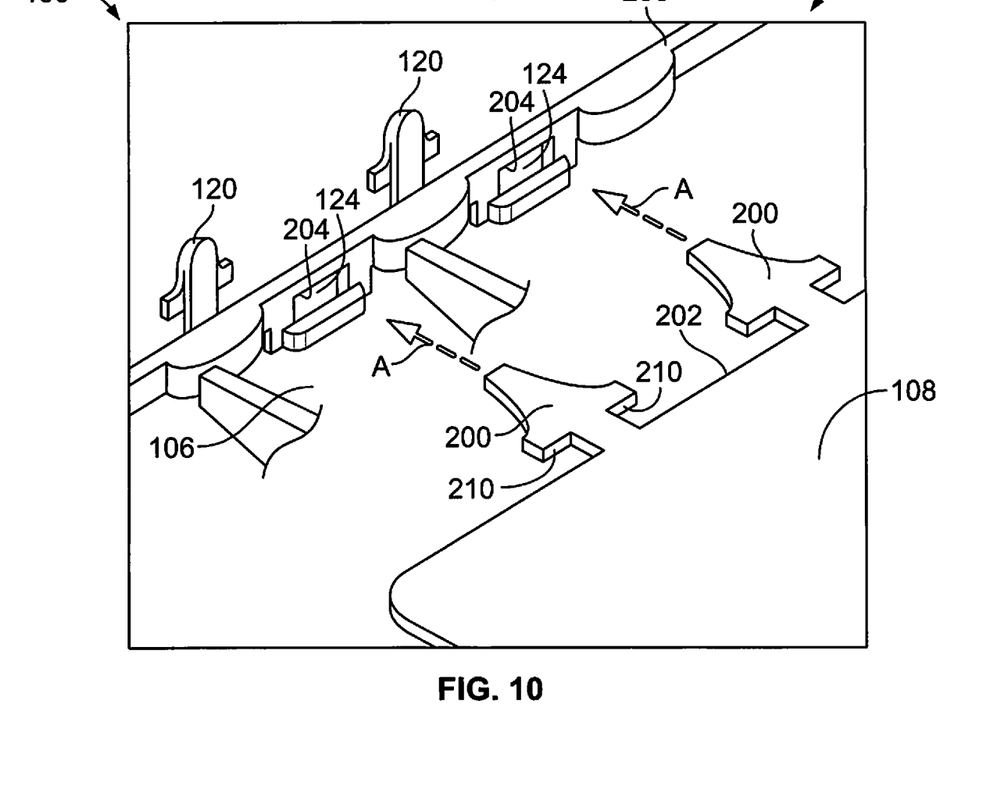
FIG. 10 illustrates a top front perspective view of a cushion aligned with attachments formed in a housing of a pressure relief assembly, according to an embodiment of the present disclosure.

FIG. 10 illustrates a top front perspective view of a cushion 108 aligned with attachments 124 formed in a housing 104 of a pressure relief assembly 100, according to an embodiment of the present disclosure. As shown, the cushion 108 may include tabs 200 that extend outwardly from an upper edge 202. In this embodiment, the attachments 124 are slots 204 formed in a frame 206 of the housing 102 above the airflow openings 106. In order to secure the cushion 108 to the housing 102, the cushion 108 is urged in the direction of arrows A so that the tabs 200 are received and retained within the slots 204 of the housing 104. As indicated above, the cushion 108 secures to the housing 104 through the attachments 124, which are separate and distinct from the attachments 120 (for example, connecting posts) that are used to secure flaps to the housing 104. The tabs 200 may include lateral protrusions 210 that help secure and maintain the tabs 200 in the slots 204. As shown, the cushion 108 may be secured at points proximate to the connecting posts 120 that are used to secure the flap to the housing 104, thereby allowing the cushion to pivot about an axis that is proximate to a pivot axis of the flap.

Figure 11:
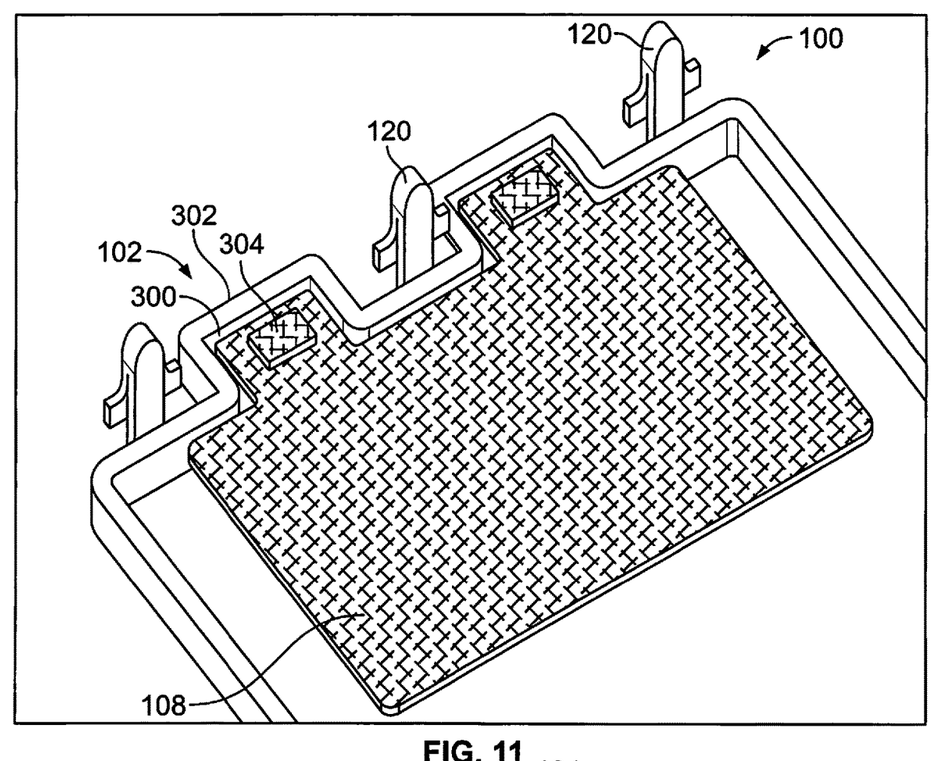
FIG. 11 illustrates a top front perspective view of a cushion secured to a housing of a pressure relief assembly, according to an embodiment of the present disclosure.

FIG. 11 illustrates a top front perspective view of a cushion 108 secured to a housing 104 of a pressure relief assembly 100, according to an embodiment of the present disclosure. As show in FIG. 11, the cushion 108 may be secured within channels 300 formed in a bracket frame 302 of the housing 102. In at least one embodiment, tabs 304 of the cushion 108 are secured to the bracket frame 302 within the channels 300 through the application of heat, such as through a heat staking process.

Figure 12:
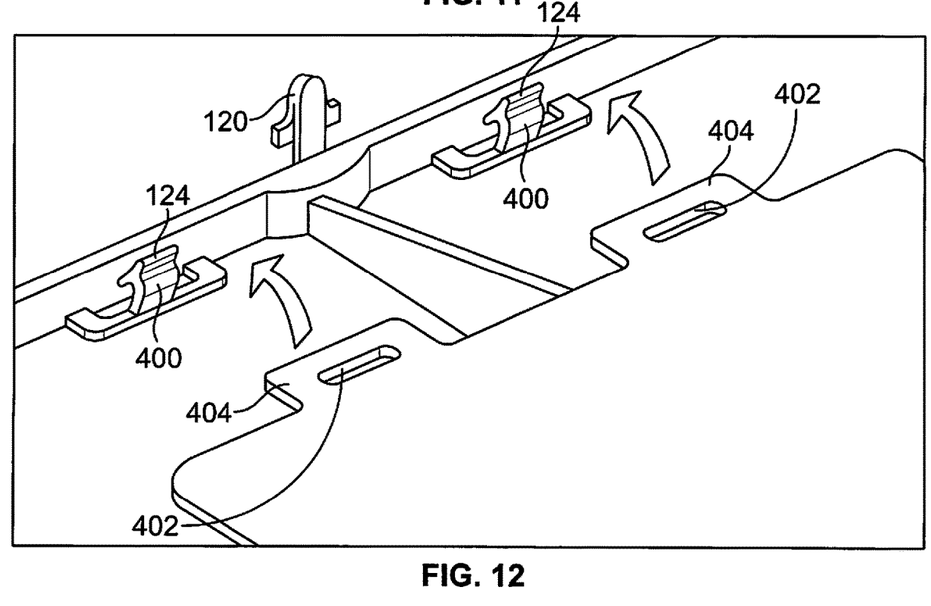
FIG. 12 illustrates a top front perspective view of a cushion aligned with attachments of a housing of a pressure relief assembly, according to an embodiment of the present disclosure.

FIG. 12 illustrates a top front perspective view of a cushion 108 aligned with attachments 124 of a housing 104 of a pressure relief assembly 100, according to an embodiment of the present disclosure. The attachments 124 may include clips 400 that are configured to extend through channels 402 formed through tabs 404 (or ears) of the cushion 108.

As described above, embodiments of the present disclosure provide a pressure relief assembly that cushions flap motion (to dampen noise and vibrations), while at the same time providing a robust and reliable sealing interface between flaps and a housing. Embodiments of the present disclosure provide a pressure relief assembly that reduces noise while maintaining a robust seal around airflow openings.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:
1. A pressure relief assembly comprising:
a housing defining a plurality of air passage chambers, wherein each of the air passage chambers have a plurality of airflow openings;
a plurality of flaps, wherein each of the plurality of flaps is secured within a respective one of the plurality of air passage chambers, wherein the plurality of flaps are configured to move into open positions to expose the plurality of airflow openings to relieve air pressure;

a plurality of cushions secured to the housing underneath the plurality of flaps, wherein the plurality of cushions are configured to cushion motion of the plurality of flaps;

a plurality of first attachments that securely couple the plurality of flaps to the housing; and a plurality of second attachments that securely couple the plurality of cushions to the housing, wherein the plurality of first attachments are separate and distinct from the plurality of second attachments, wherein the plurality of flaps are configured to sealingly engage the housing around the plurality of airflow openings without the plurality of cushions interfering with the plurality of flaps sealingly engaging the housing, wherein at least one cushion of the plurality of cushions includes a plurality of clearance holes, and wherein a plurality of protuberances extend outwardly from support ribs and extend through the plurality of clearance holes of the at least one cushion when the at least one cushion is seated on the support ribs, and wherein at least one of the plurality of protuberances is configured to abut an underside of the flap.

2. The pressure relief assembly of claim 1, wherein the plurality of first attachments are at a plurality of first locations of the housing, wherein the plurality of second attachments are at a plurality of second locations of the housing, and wherein the plurality of first locations differ from the plurality of second locations.

3. The pressure relief assembly of claim 1, wherein the plurality of first attachments are outside of the plurality of airflow openings, and wherein the plurality of second attachments extend into the plurality of airflow openings.

4. The pressure relief assembly of claim 1, wherein each of the plurality of flaps has a first size and a first shape, wherein each of the plurality of cushions has a second size and a second shape, and wherein the first size and the first shape differ from the second size and the second shape.

5. The pressure relief assembly of claim 1, wherein each of the plurality of flaps has a first peripheral envelope, wherein each of the plurality of cushions has a second peripheral envelope, and wherein the first peripheral envelope is greater than the second peripheral envelope.

6. The pressure relief assembly of claim 1, wherein each of the plurality of flaps is formed of a flexible thermoplastic elastomer, and wherein each of the plurality of cushions is formed of felt.

7. A pressure relief assembly comprising:

a housing defining an air passage chamber having at least one airflow opening;

a flap formed of a flexible thermoplastic elastomer secured within the air passage chamber, wherein the flap is configured to move into an open position to expose the at least one airflow opening to relieve air pressure, wherein the flap has a first size and a first shape, wherein the flap has a first peripheral envelope;

a cushion formed of felt secured to the housing underneath the flap, wherein the cushion is configured to cushion motion of the flap, wherein the cushion has a second size and a second shape, wherein the first size and the first shape differ from the second size and the second shape, wherein the cushion has a second peripheral envelope, wherein the first peripheral envelope is greater than the second peripheral envelope, and wherein the cushion includes a plurality of tabs that extend outwardly from an upper edge of the cushion;

a first attachment comprising a connecting post at a first location of the housing that securely couples the flap to the housing, wherein the first attachment is outside of the at least one airflow opening; and a second attachment comprising a hook dimensioned to engage one of the plurality of tabs at a second location of the housing that securely couples the cushion to the housing, wherein the first attachment is separate and distinct from the second attachment, wherein the first location differs from the second location, wherein the second attachment extends into the at least one airflow opening, wherein the flap is configured to sealingly engage the housing around the at least one airflow opening without the cushion interfering with the flap sealingly engaging the housing.

8. The pressure relief assembly of claim 7, wherein the cushion comprises at least one clearance hole, wherein the housing comprises at least one protuberance extending outwardly from a support rib, wherein the at least one protuberance outwardly extends through the at least one clearance hole when the cushion is seated on the support rib, and wherein the at least one protuberance is configured to abut into an underside of the flap.

* * * * *